UNITED STATES PATENT OFFICE.

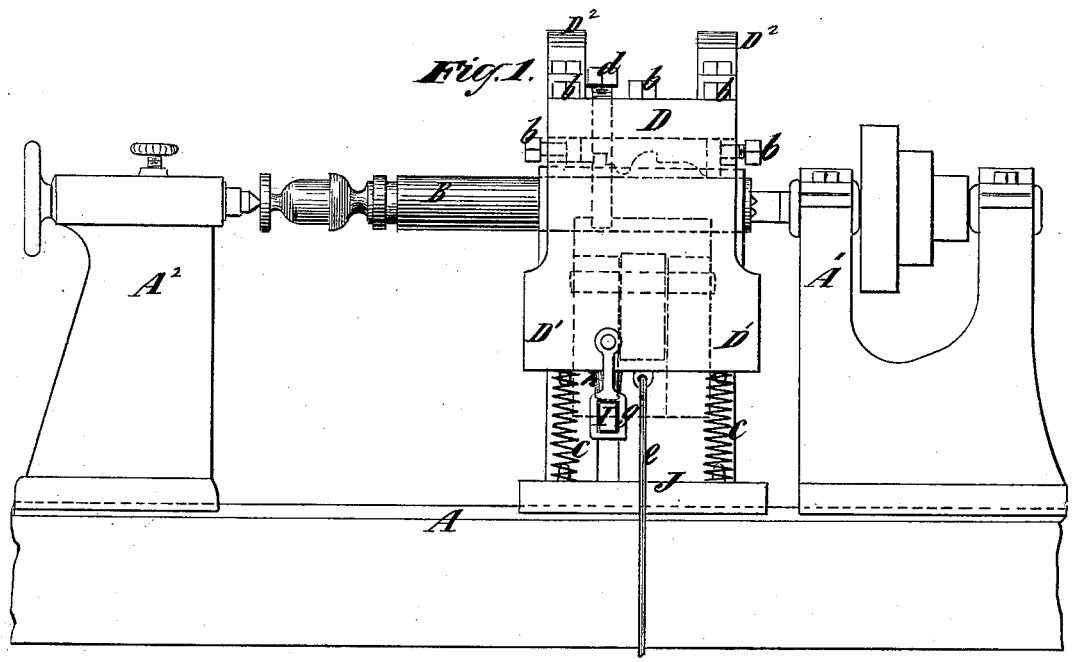
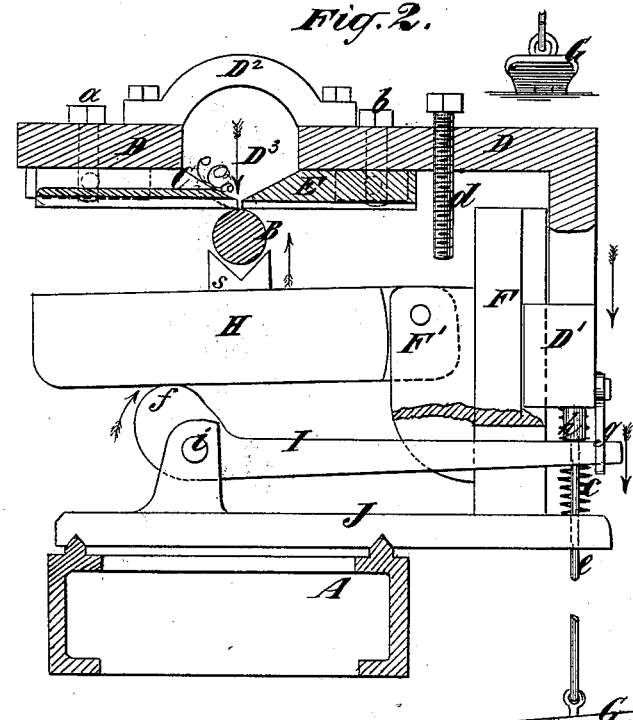
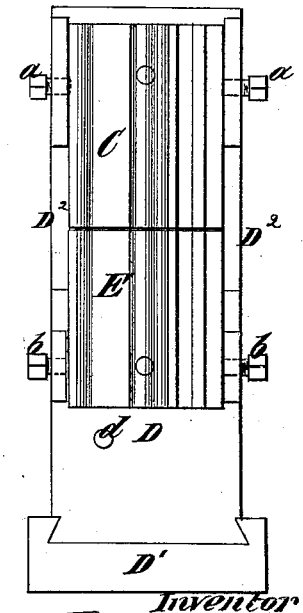

JAMES H. HOWELL, OF NEWARK, NEW JERSEY, ASSIGNOR TO JAMES T. BOICE, OF SAME PLACE.

IMPROVEMENT IN TURNING-LATHES.

Specification forming part of Letters Patent No. 221,311, dated November 4, 1879; application filed September 12, 1879.

*To all whom it may concern:*

Be it known that I, JAMES H. HOWELL, of Newark, in the county of Essex and State of New Jersey, have invented certain new and useful Improvements in Turning-Lathes, of which the following is a specification.

My invention relates to lathes or attachments for lathes for turning the ornaments or members upon rails, such as stair-balusters and the like.

My invention consists in the combination, in a turning-lathe, with a cutter and a gage to regulate the depth of the cut, of a bodily-adjustable cutter head or carrier, to which said cutter and gage are secured, provided with a stock-piece, a guide for said stock-piece, a lever for adjusting said cutter-head along said guide toward and from the work, and preferably, also, means for maintaining the cutter-head in an elevated position when not otherwise actuated, and an adjustable stop carried by said cutter-head for limiting its movement.

It also consists in the combination, in a turning-lathe, with a cutter, a bodily-adjustable cutter head or carrier to which said cutter is secured, provided with a stock-piece, a guide for said stock-piece, and a lever for adjusting said cutter-head along said guide, of an adjustable rest supported independently of the cutter-head for sustaining the work opposite to said cutter, the said rest being preferably hinged at one end, and a lever for moving said rest toward and from the work.

It also consists in the combination, in a turning-lathe, with a cutter, a bodily-adjustable cutter head or carrier provided with a stock-piece, and a guide for said stock-piece, of an adjustable rest, supported independently of the cutter-head for sustaining the work opposite the cutter, and a lever serving the double purpose of moving the cutter to the work and moving said rest to sustain the work in unison.

It also consists in various details and combinations of parts hereinafter to be described.

In the accompanying drawings, Figure 1 represents a side view of a lathe having applied thereto an attachment embodying my invention. Fig. 2 represents an irregular transverse section thereof, Fig. 1; and Fig. 3 represents an inverted plan view of the cutter, gage, and the cutter-head to which the same are secured.

Similar letters of reference designate corresponding parts in all the figures.

Although my improvements might be embodied in a lathe specially constructed for the purpose, they are here shown as embodied in an attachment for an ordinary turning-lathe, of which A designates the shears, and $A'$ $A^2$, respectively, the head and tail stocks, between which is held and supported a rail-baluster, B, or other article to be turned. C designates a cutter, shaped to produce the desired ornament, and secured to a cutter head or carrier, D, by means of bolts $a$. This cutter is cut away upon its upper side, as represented in Fig. 2, so as to afford a free circulation of air over it and prevent heating.

E designates a gage, also secured to the cutter head or carrier by bolts $b$, and having its face shaped to correspond with the cutter C. This gage is to be arranged in such relation to the cutter as to regulate the depth of the cut, and its edge which bears upon the work is beveled, so as to pass the shavings freely over it.

The cutter head or carrier, as here represented, is provided with a stock-piece, $D'$, (here shown as provided with gibs,) which engage with a guide, F, and serve to hold the same steadily, while admitting of its adjustment toward and from the work—in this instance upward and downward.

The cutter head or carrier, when not otherwise actuated, is maintained in an elevated position by suitable means, (here shown as consisting of spiral springs, arranged under the same,) and the portion of the cutter head or carrier between the gage and the cutter is cut away, the two parts being held together by braces $D^2$, thus forming a cavity, $D^3$, for the reception and escape of shavings produced by the cutter C.

I would here remark that although the cutter head or carrier D is shown as extending from its supporting stock-piece $D'$ at a right angle, it may extend obliquely therefrom, or may be connected thereto by a curve or bend.

To regulate the size to which the work is to be reduced, and to prevent the undue lowering of the cutter head or carrier D, I provide an adjustable stop, (here shown as consisting of a screw, $d$,) inserted in the cutter head or carrier, and adapted to strike a portion of the stationary guide when the cutter head or carrier is lowered.

I have here represented a lever, (here shown as consisting of a foot-lever or treadle,) G, as connected by a rod, $e$, with the cutter head or carrier D, and serving to draw the same down; but other means might be employed for this purpose—such, for instance, as a hand-lever.

H designates a rest, supported independently of the cutter-head, adapted to sustain the work opposite the cutter, and carrying a removable V-shaped piece, $s$, which may be changed to suit work of different diameter. This rest is adjustable to and from the work, and, though it might be made bodily adjustable, I have represented it as hinged at one end to a supporting lug or lugs, F', extending from the guide F, and capable of adjustment by swinging upon said hinge.

I designates a lever, pivoted at $i$, provided with a cam-face, $f$, and arranged below the rest H, so that the cam-face bears upon the same. This lever is intended to be so connected to the cutter head or carrier that it will be raised in unison therewith, and it may with advantage be connected directly to the cutter head or carrier, so as to be raised and lowered thereby. As here represented, the cutter head or carrier is provided with a stirrup, $g$, embracing the end of the lever I, and serving to raise the same, and also with a push piece or pin, $h$, which bears upon the said lever and pushes it downward simultaneously with the lowering of the cutter-head.

J designates a base-plate, upon which my attachments are mounted, and which is adapted to be adjusted along the shears A of the lathe, to operate upon different portions of a rail to be ornamented.

By my invention I provide an attachment which may be applied directly to an ordinary wood-turning lathe without modification of the latter, and which, as the cutter is brought down to the work and the rest raised simultaneously, is very simple in its mode of operation.

What I claim as my invention, and desire to secure by Letters Patent, is—

1. The combination, with a cutter for turning and a gage for regulating the depth of the cut, of a bodily-adjustable cutter head or carrier, to which the said cutter and gage are secured, provided with a stock-piece, a guide with which said stock-piece engages, and a lever for adjusting said cutter head or carrier along said guide toward and from the work, substantially as specified.

2. The combination, with a cutter for turning and a gage for regulating the depth of the cut, of a bodily-adjustable cutter head or carrier, to which said cutter and gage are secured, provided with a stock-piece, a guide with which said stock-piece engages, a lever for adjusting said cutter-head along said guide toward the work, and means for automatically elevating the cutter head or carrier when released by said lever, substantially as specified.

3. The combination, with a cutter for turning and a gage for regulating the depth of the cut, of a bodily-adjustable cutter head or carrier, to which the cutter and gage are secured, provided with a stock-piece, a guide for said stock-piece, a lever for adjusting said cutter head or carrier toward the work, and an adjustable stop carried by the cutter-head for limiting its movement, substantially as specified.

4. The combination, with a cutter, a bodily-adjustable cutter head or carrier, to which said cutter is secured, provided with a stock-piece, a guide for said stock-piece, and a lever for adjusting said cutter-head along said guide, of an adjustable rest for sustaining the work opposite the cutter, supported independently of the cutter-head, and a lever for moving said rest toward and from the work, substantially as specified.

5. The combination, with a cutter, a bodily-adjustable cutter head or carrier, to which said cutter is secured, provided with a stock-piece, a guide for said stock-piece, and a lever for adjusting said cutter-head along said guide, of an adjustable rest, hinged at one end, for sustaining the work opposite the cutter, and supported independently of the cutter head or carrier, and a lever for moving said rest toward and from the work, substantially as specified.

6. The combination, with a cutter, of an adjustable rest, supporting the work opposite the cutter, and a lever provided with a cam-face for moving said rest toward the work, substantially as specified.

7. The combination, with a cutter, of an adjustable rest, hinged at one end, for supporting the work opposite the cutter, and a lever provided with a cam-face for moving said rest toward the work, substantially as specified.

8. The combination, with a cutter, a bodily-adjustable cutter head or carrier, to which said cutter is secured, provided with a stock-piece, and a guide for said stock-piece, of an adjustable rest, supported independently of the cutter-head, for sustaining the work opposite the cutter, and a lever serving the double purpose of moving the cutter to the work and moving said rest to sustain the work in unison, substantially as specified.

9. The combination, with a cutter, an adjustable cutter head or carrier, to which said cutter is secured, and guides for said cutter head or carrier, of an adjustable rest for supporting the work opposite the cutter, and a lever having a cam-face for acting on said rest, and connected to the said cutter-head, so as to be operated in unison therewith, substantially as specified.

10. The combination of the cutter C, the cutter head or carrier D, to which the cutter is secured, the guides F, the springs c, the adjustable rest H, the cam-lever I, actuated by the stirrup g and push-piece h, and the treadle G, for operating the cutter head or carrier and rest in unison, substantially as specified.

JAMES H. HOWELL.

Witnesses:
 EDWIN H. BROWN,
 T. J. KEANE.